Sept. 9, 1924.
H. W. IBBOTT
1,507,965
TUBE OR CONDUIT FOR THE TRANSMISSION OF MOVEMENT BY MEANS OF LIQUIDS
Filed Oct. 20, 1920
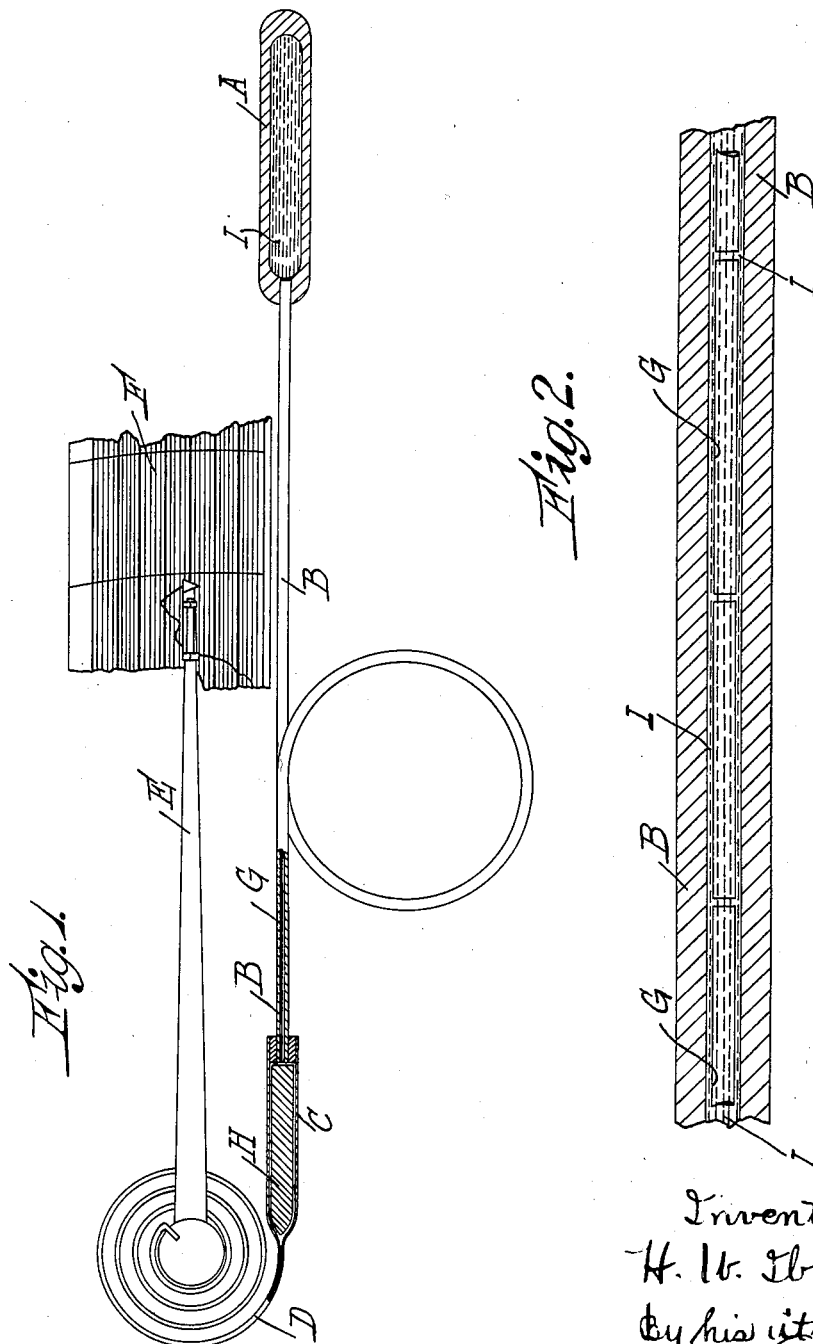

Patented Sept. 9, 1924.

1,507,965

UNITED STATES PATENT OFFICE.

HAROLD WILLIAM IBBOTT, OF LONDON, ENGLAND, ASSIGNOR TO NEGRETTI AND ZAMBRA, OF LONDON, ENGLAND.

TUBE OR CONDUIT FOR THE TRANSMISSION OF MOVEMENT BY MEANS OF LIQUIDS.

Application filed October 20, 1920. Serial No. 418,321.

*To all whom it may concern:*

Be it known that I, HAROLD WILLIAM IBBOTT, a subject of the King of Great Britain, residing at 38 Holborn Viaduct, London, England, have invented a new and useful Improvement in Tubes or Conduits for the Transmission of Movement by Means of Liquids, of which the following is a specification.

This invention relates to tubes or conduits used for containing liquid by which a movement at one end of the tube or conduit is transmitted to the other end thereof with the object of actuating an indicator or some other mechanism, as, for instance, in "distance" or "transmitting" thermometers in which the scale and index are situated at a considerable distance from the bulb. When the tube or conduit and the liquid therein are subject to variations of temperature an error may occur in the indicator or in the amount of the movement impressed upon the mechanism owing to a longitudinal movement of the liquid relative to the tube.

The object of this invention is the prevention of such errors.

According to this invention I insert in the tube a core of a material having a smaller co-efficient of expansion than has the material of the tube, and I fill the space remaining within the tube with liquid. The ratio of the sectional area of the core to the sectional area of the bore of the tube will depend upon the co-efficients of expansion of the core, the tube and the liquid employed. I can thus provide a connecting tube in which there will be no longitudinal movement of the liquid due to change in temperature of the tube and liquid.

The core is preferably in the shape of a rod or wire which is conveniently cut up into lengths as this prevents the core from sticking to the wall of the tube when the latter is bent as is frequently necessary for passing round corners and so on.

Preferably I form the connecting tube of a steel having a high co-efficient of expansion, while the core is formed of wire of a steel having a low co-efficient of expansion, and I employ mercury as the liquid.

The indicating mechanism may be a piston, a Bourdon tube or diaphragm actuating an index.

My invention is illustrated by the accompanying drawing, Figure 1 of which is a side view partly in section of a distance or transmitting thermometer, while Figure 2 is a part section of the tube to a larger scale. A is a thermometer bulb communicating by a tube B with a cylinder C which itself communicates with a Bourdon tube D carrying an index E over a scale F. The bore of the tube is partly filled by a core G consisting of a number of short lengths of a wire formed of steel having a low co-efficient of expansion such as 36 per cent nickel steel. The interior of the cylinder C is partially filled by a block H formed of material similar to that of the core G. The walls of the bulb, tube and cylinder, are formed of a steel having a high co-efficient of expansion, such as 20 per cent nickel steel, and the bulb and the remaining space within the tube B and the cylinder C are filled with mercury I.

The parts C and H are prolongations of the parts B and G, respectively, but the bulb C and large core H are to compensate for any possible movement of the liquid in the manometer coil D due to change in temperature at that point, which change would not be compensated for at the tube B.

What I claim is:—

The combination of a thermometer bulb, a tube extending therefrom, a core located within the tube and formed of a material having a smaller coefficient of expansion than has the material of which the tube is formed, a cylinder in communication with the end of the tube remote from the bulb, a block located within the cylinder and formed of a material having a smaller co-efficient of expansion than has the material of which the cylinder is formed, a liquid filling the bulb and the interstices between the tube and the core and between the block and the cylinder and means for registering the movements of the liquid in the cylinder.

In testimony that I claim the foregoing as my invention I have signed my name this 23rd day of September, 1920.

HAROLD WILLIAM IBBOTT.